United States Patent
Qiao et al.

(10) Patent No.: US 12,474,486 B2
(45) Date of Patent: Nov. 18, 2025

(54) WAVE SPECTRUM CALCULATION METHOD BASED ON GNSS WAVE MEASURING BUOY

(71) Applicant: FIRST INSTITUTE OF OCEANOGRAPHY, MINISTRY OF NATURAL RESOURCES, Qingdao (CN)

(72) Inventors: Fangli Qiao, Qingdao (CN); Shumin Jiang, Qingdao (CN); Chen Xue, Qingdao (CN); Jingsong Guo, Qingdao (CN); Yanfeng Wang, Qingdao (CN); Yanxiong Liu, Qingdao (CN)

(*) Notice: Subject to any disclaimer, the term of this patent is extended or adjusted under 35 U.S.C. 154(b) by 0 days.

(21) Appl. No.: 18/659,117

(22) Filed: May 9, 2024

(65) Prior Publication Data
US 2024/0377542 A1    Nov. 14, 2024

(30) Foreign Application Priority Data
May 10, 2023    (CN) .......................... 202310517281.7

(51) Int. Cl.
*G01S 19/42* (2010.01)
*G01S 19/52* (2010.01)
(Continued)

(52) U.S. Cl.
CPC .............. *G01S 19/42* (2013.01); *G01S 19/52* (2013.01); *G01S 19/00* (2013.01); *G01S 19/40* (2013.01)

(58) Field of Classification Search
CPC .......... G01S 19/42; G01S 19/52; G01S 19/00; G01S 19/40
(Continued)

(56) References Cited

U.S. PATENT DOCUMENTS

| | | | | |
|---|---|---|---|---|
| 6,847,326 B2* | 1/2005 | Harigae | .................. | G01S 19/35 |
| | | | | 342/357.57 |
| 8,195,395 B2* | 6/2012 | Teng | ...................... | B63B 22/00 |
| | | | | 702/50 |

(Continued)

FOREIGN PATENT DOCUMENTS

| | | | | |
|---|---|---|---|---|
| CN | 102829770 A | * | 12/2012 | ............. G01S 19/52 |
| CN | 106525006 A | * | 3/2017 | ............. G01C 13/00 |

(Continued)

*Primary Examiner* — Chuong P Nguyen
(74) *Attorney, Agent, or Firm* — Hemisphere Law, PLLC; Zhigang Ma (57) ABSTRACT

A wave spectrum calculation method based on GNSS wave measuring buoy is provided, which includes: placing GNSS drift buoys in the sea, collecting buoy position data; then obtaining three-dimensional velocity data of ocean waves; performing high pass filtering on velocity data of a sliding window to remove noise signals and trend terms, retaining wave motion data; calculating a cross spectrum and wave direction spectrum. The present disclosure solves limitations of traditional GNSS measurement methods applied to ocean buoy wave measurement, such as limited observation distance, high cost, tedious measurement and average calculation accuracy, and a need for correction services. The measurement accuracy is high and no additional correction services are required, which is more suitable for wave measurement, the wave spectrum algorithm in this method can adapt to more complex observation environments and incorporate results of a velocity measurement algorithm into a matched wave spectrum algorithm.

10 Claims, 1 Drawing Sheet

(51) Int. Cl.
  *G01S 19/00* (2010.01)
  *G01S 19/40* (2010.01)
(58) Field of Classification Search
  USPC ............... 342/357.25, 357.35, 357.2, 357.23
  See application file for complete search history.

(56) References Cited

U.S. PATENT DOCUMENTS

| | | | |
|---|---|---|---|
| 9,739,882 B2* | 8/2017 | Strong | G01S 15/62 |
| 10,488,554 B2* | 11/2019 | Pierik | G01W 1/04 |
| 11,543,537 B1* | 1/2023 | Li | G01S 19/36 |
| 11,808,570 B2* | 11/2023 | Beatty | G01C 13/002 |
| 12,061,083 B2* | 8/2024 | Previsic | G06F 30/27 |
| 12,130,138 B2* | 10/2024 | Previsic | G05D 1/43 |
| 2015/0025804 A1* | 1/2015 | Jones | G01C 13/004 702/2 |
| 2020/0209429 A1* | 7/2020 | Pierik | G01S 19/13 |
| 2022/0155069 A1* | 5/2022 | Previsic | G05D 1/0206 |
| 2023/0288578 A1* | 9/2023 | Liu | G01S 19/52 |

FOREIGN PATENT DOCUMENTS

| | | | | |
|---|---|---|---|---|
| CN | 114620186 A | * | 6/2022 | ............ B63B 22/18 |
| CN | 115451921 A | * | 12/2022 | ............ G01S 19/52 |
| CN | 116258787 B | * | 10/2023 | ............ G06T 11/00 |
| JP | 2003302221 A | * | 10/2003 | ............ G01C 13/002 |
| WO | WO-2024007365 A1 | * | 1/2024 | ............ G01S 19/256 |

\* cited by examiner

WAVE SPECTRUM CALCULATION METHOD BASED ON GNSS WAVE MEASURING BUOY

CROSS-REFERENCE TO RELATED APPLICATIONS

This application claims priority to Chinese Patent Application No. 202310517281.7, filed on May 10, 2023, which is hereby incorporated by reference in its entirety.

TECHNICAL FIELD

The present disclosure relates to the field of ocean wave directional spectrum calculation technology technologies, and in particular, to a wave spectrum calculation method based on GNSS wave measuring buoys.

BACKGROUND

At present, basic principles of wave measurement applied on GNSS wave buoys in the market are mainly divided into two types:

1. Position information of the buoy is directly obtained through precise positioning. The mainstream positioning technology includes precision single point positioning, which requires the purchase of high-precision satellites, orbital products, and corresponding commercial software, resulting in high costs and difficulty in large-scale deployment; it can real time dynamic measure, but this technology relies on signal reference stations near the shore, which limits the ability of buoys to conduct offshore surveys.

2. Three-dimensional velocity information of the wave carrier is obtained firstly and then integrate to obtain the displacement of the waves. There are still buoy mounted accelerometers in the market for wave measurement, but this method has a low sampling frequency and uses an instantaneous velocity at that moment when integrating velocity into displacement. There is a large error in displacement calculation, resulting in inaccurate calculation of wave spectrum and wave parameters.

In summary, the application of traditional GNSS measurement methods in ocean buoys wave measurement has many limitations, such as limited observation distance, high cost, cumbersome calculation and average accuracy, and the need for correction services. Therefore, an improvement is needed.

SUMMARY

The purpose of the present disclosure is to provide a wave spectrum calculation method based on GNSS wave buoys, which solves the many limitations of traditional GNSS measurement methods applied to ocean buoy wave measurement, such as limited observation distance, high cost, cumbersome calculation and average accuracy, and a need for correction services. The calculation accuracy is high, and no additional correction service is required, it is more suitable for wave measurement. The wave spectrum algorithm in this method can adapt to more complex observation environments, and the results of the velocity measurement algorithm can be brought into a matched wave spectrum calculation method. The algorithm is simple and stable.

In order to achieve the above objectives, the present disclosure provides a wave spectrum calculation method based on GNSS (global navigation satellite system) wave buoys, the variometric differential positioning algorithm is used to calculate a relative displacement of the buoy in a short time through high-frequency sampling results; and the wave spectrum calculation method includes the following steps:

step 1: placing GNSS drift buoys in the sea, collecting buoy position data;

step 2: obtaining three-dimensional velocity data of ocean waves with the variometric differential positioning algorithm;

step 3: performing high pass filtering to velocity data of a sliding window within a preset time M2 to remove noise signals and trend terms, retaining wave motion data;

step 4: calculating cross spectra and wave directional spectra with Longuet-Higgins method.

In an embodiment, in step 2, GNSS drift buoys drift on the ocean at a preset time M1, data measured during a drifting process of the GNSS drift buoys is preprocessed and transmitted to ship or shore base through Beidou or Iridium communication so as to achieve real-time transmission and processing of the data; the three-dimensional velocity data is obtained through the variometric differential positioning algorithm.

In an embodiment, the variometric differential positioning algorithm is a differential observation equation obtained by subtracting standard original current carrying observation equation of adjacent epochs; various epochs dada of multiple satellites are substituted into a variometric differential positioning model, a plurality of observation equations for to-be-solved three-dimensional velocity are obtained with the variometric differential positioning algorithm; the three-dimensional velocity of the buoys is obtained by the observation equation with a least squares method;

the standard original current carrying observation equation is formula (1):

$$\lambda \Phi_r^s = \rho_r^s + c(\delta t_r - \delta t^s) + T_r^s - I_r^s - \lambda N_r^s + p_r^s + m_r^s + \varepsilon_r^s, \quad (1)$$

$\Phi_r^s$ is a carrier phase observation value of a receiver relative to a satellite; a carrier wavelength;

$\rho_r^s$ is to a pseudorange between the satellite and the receiver;

c is the light speed;

$\delta t_r$ and $\delta t^s$ represent receiver clock error and satellite clock error respectively;

$T_r^s$ r is a tropospheric error;

$I_r^s$ is an ionospheric error;

$N_r^s$ is an ambiguity of an entire week;

$p_r^s$ is other influence factors;

$m_r^s$ is a multipath effect;

$\varepsilon_r^s$ is noise influence.

In an embodiment, in step 3, two adjacent epochs (t, t+1) are taken, the two epochs (t, t+1) are respectively substituted into the standard original current carrying observation equation to obtain observation values corresponding to the two epochs; the two equations are subtracted, an ionospheric error term is reduced to second order by applying ionospheric free combination to obtain the following ionospheric time single difference observation equation;

the ionospheric time single difference observation equation is formula (2):

$$\alpha[\lambda\Delta\Phi_r^s(t, t+1)]_{L1} + \beta[\lambda\Delta\Phi_r^s(t, t+1)]_{L2} = \quad (2)$$
$$\Delta\rho_r^s r(t, t+1) + c(\Delta\delta_r(t, t+1) - \Delta\delta^s(t, t+1)) +$$
$$\Delta T_r^s(t, t+1) + \Delta p_r^s(t, t+1) + \Delta m_r^s(t, t+1) + \Delta\varepsilon_r^s(t, t+1),$$

where, $\alpha=(f^2/(f_{L1}^2-f_{L2}^2))$ and $\beta=(-f_{L2}^2/(f_{L1}^2-f_{L2}^2))$ are standard coefficient of ionospheric combination;
$\Delta\Phi_r^s$ is a difference of carrier phase observation value of the receiver relative to the satellite;
L1 is a first type of receiver frequency signal;
L2 is a second type of receiver frequency signal;
$\Delta\rho_r^s$ is a difference of pseudorange between the satellite and the receiver;
r is a subscript of the receiver;
$\Delta\delta_r$ is a difference clock deviation of the receiver;
$\Delta\delta^s$ is a difference of clock deviation of the satellite;
$\Delta T_r^s$ is a difference in tropospheric error;
$\Delta p_r^s$ is an error difference affected by other factors;
$\Delta m_r^s$ is an error difference of multipath effects;
$\Delta\varepsilon_r^s$ is a noise value in a single time difference;
f is an expected signal frequency;
$f_{L1}^2$ is a square value of the first type receiver frequency;
$f_{L2}^2$ is a square value of the second type of receiver frequency.

In an embodiment, in the geocentric cartesian coordinate system, $\Delta\rho_r^s(t,t+1)$ is affected by geometric changes $[\Delta\rho_r^s(t,t+1)]_{OR}$ caused by satellite orbit motion and Earth rotation, as well as affected by solid tides and ocean loads $[\Delta\rho_r^s(t,t+1)]_{EtOl}$, as shown in formula (3):

$$\Delta\rho_r^s(t, t+1) = [\Delta\rho_r^s(t, t+1)]_{OR} + [\Delta\rho_r^s(t, t+1)]_{EtOl}, \quad (3)$$

in the formula, $\Delta\varepsilon_r^s(t,t+1)$ is the noise in a single time difference.

In an embodiment, the GNSS drift buoys generate a 3D direction displacement $\Delta\xi_r(t,t+1)$ in unit time; a calculation formula is formula (4) when a high-frequency calculation is used:

$$\Delta\rho_r^s(t, t+1) = [\Delta\rho_r^s(t, t+1)]_{OR} + [\Delta\rho_r^s(t, t+1)]_{EtOl} + [\Delta\rho_r^s(t, t+1)]_D \quad (4)$$
$$\Delta\rho_r^s(t, t+1) = [\Delta\rho_r^s(t, t+1)]_{OR} + [\Delta\rho_r^s(t, t+1)]_{EtOl} + e_r^s \cdot \Delta\xi_r(t, t+1),$$

$e_r^s$ is unit vector in all directions; $\Delta\rho_r^s$ is the difference of pseudorange between the satellite and the receiver; $\Delta\xi_r$ is a displacement scalar difference in three-dimensional direction of the receiver;
$\Delta T_r^s(t,t+1)$ is a change of a tropospheric delay term within a unit time interval, a tropospheric zenith delay $TZD_{SB}$ can be calculated by molding, a formula (5) is obtained with a simple inverse cosine function through a Saastamoinen model:

$$\Delta T_r^s(t, t+1) = TZD_{SB}[1/\cos(Z_r^s(t+1)) - 1/\cos(Z_r^s(t))] \quad (5)$$

$Z_r^s$ is a zenith angle of the satellite relative to the GNSS drift buoys, and the high frequency >1 Hz.

In an embodiment, a formula (6) can be obtained through formulas (1), (2), (3), (4) and (5)

$$\alpha[\lambda\Delta\Phi_r^s]_{L1} + \beta[\lambda\Delta\Phi_r^s]_{L2} = (e_r^s \cdot \Delta\xi_r + c\Delta\delta t_r) + \quad (6)$$
$$([\Delta\rho_r^s]_{OR} - c\Delta\delta t^s + TZD_{SB}[1/\cos(Z_r^s(t+1)) - 1/\cos Z_r^s(t)]) +$$
$$([\Delta\rho_r^s]_{EtOl} + \Delta p_r^s) + \Delta m_r^s + \Delta\varepsilon_r^s;$$

where $\alpha[\lambda\Delta\Phi_r^s]_{L1}+\beta[\lambda\Delta\Phi_r^s]_{L2}$ is the observation value of time single difference without ionospheric influence, $(e_r^s \cdot \Delta\xi_r + c\Delta\delta t_r)$ is three-dimensional velocity result and four unknown terms of clock error of GNSS receiver,
$\Delta\Phi_r^s$ is a difference of a carrier phase observation value of a receiver relative to a satellite;
$\Delta\xi_r$ is a displacement scalar difference in three-dimensional direction of the receiver;
$\Delta\delta t_r$ is a difference of clock error of the receiver;
$\Delta\rho_r^s$ is a difference of pseudorange between the satellite and the receiver;
$\Delta\delta t^s$ is a difference of clock error of the satellite;
is $\Delta p_r^s$ difference of errors influence by other factors;
$\Delta m_r^s$ is a difference of error caused by multipath effects;
$\Delta\varepsilon_r^s$ is the noise difference in a single time difference.

In an embodiment, in step 4, GNSS satellite antenna receives satellite ephemeris file and transmits the ephemeris file to a data processing module; the data processing module reads the ephemeris file, inputs original data consisting of carrier phase observations, pseudorange, and clock deviation of each epoch in the ephemeris file into a simultaneous equation system, the wave direction spectrum is obtained through the Longuet-Higgins method, and the three-dimensional velocity of the buoys is calculated;

three-dimensional information calculated of the buoys is denoted as $\phi\eta_{tt}, \eta_x, \eta_y$, then a cross spectral matrix can be written as formula (7):

$$\Phi_{mn} = \begin{pmatrix} \phi_{\eta_{tt}\eta_{tt}} & \phi_{\eta_{tt}\eta_x} & \phi_{\eta_{tt}\eta_y} \\ \phi_{\eta_x\eta_{tt}} & \phi_{\eta_x\eta_x} & \phi_{\eta_x\eta_y} \\ \phi_{\eta_y\eta_{tt}} & \phi_{\eta_y\eta_x} & \phi_{\eta_y\eta_y} \end{pmatrix} \quad (7)$$

elements of the cross spectral matrix are normalized by dividing a transfer function G(w), and a normalized cross spectral matrix is given by formula (8):

$$\Phi'_{mn} = \begin{pmatrix} n_{11} & n_{12} & n_{13} \\ n_{12} & n_{22} & n_{23} \\ n_{13} & n_{23} & n_{33} \end{pmatrix}, \quad (8)$$

where $n_{11} = \dfrac{\phi_{\eta_{tt}\eta_{tt}}}{w^4}$, $n_{12} = \dfrac{\phi_{\eta_{tt}\eta_x}}{-ikw^2}$, $n_{13} = \dfrac{\phi_{\eta_{tt}\eta_y}}{-ikw^2}$, $n_{22} = \dfrac{\phi_{\eta_x\eta_x}}{-k^2}$, $n_{23} = \dfrac{\phi_{\eta_x\eta_y}}{-k^2}$, $n_{33} = \dfrac{\phi_{\eta_y\eta_y}}{-k^2}$, in the formulas (7) and (8), all elements are real number;
w is a frequency of power spectral density at the expected frequency; k is wavenumber at the expected frequency.

In an embodiment, the matrix of formulas (7) and (8) is inverted to obtain the three-dimensional velocity of the buoys, and a calculation formula is formula (9):

$$F(\omega, \theta) = Q(\omega)[M_0 M_2(\gamma^2\cos^2\hat{\theta} + \sin^2\hat{\theta}) - M_1^2\sin^2(\hat{\theta} - \hat{\theta}_m) - \qquad (9)$$
$$2M_1 M_2(\gamma^2\cos\hat{\theta}\cos\hat{\theta}_m + \sin\hat{\theta}\sin\hat{\theta}_m) + M_2^2\gamma^2]^{-1},$$

where $M_0 = n_{11}$, $$M_1 = \sqrt{(n_{12}^2 + n_{13}^2)},$$

$$M_2 = \frac{n_{22} + n_{33}}{2} + \sqrt{\left(\frac{n_{22} - n_{33}}{2}\right)^2 + n_{23}^2},$$

$$\hat{\theta} = \theta - \theta_p,$$

$$\hat{\theta}_m = \theta_m - \theta_p,$$

$$\theta_m = \tan^{-1}\left(\frac{n_{13}}{n_{12}}\right),$$

$$\theta_p = \frac{1}{2}\tan^{-1}\left(\frac{2n_{23}}{n_{22} - n_{33}}\right)$$

$$\gamma^2 = \frac{(n_{22} + n_{33}) - \sqrt{(n_{22} - n_{33})^2 + 4n_{23}^2}}{(n_{22} + n_{33}) + \sqrt{(n_{22} - n_{33})^2 + 4n_{23}^2}},$$

where Q(w) is a normalization factor,
$M_1^2$ is a combination coefficient, $M_1$ is a square value,
$M_2^2$ is a combination coefficient, that is, $M_2$ is a square value.

In an embodiment, in step 1, the GNSS drift buoys include a housing, the housing is provided with a magnetic switch, the housing is provided with a lithium battery pack, a control motherboard, a GNSS satellite antenna, a satellite communication module, a data processing module, and a storage module, the magnetic switch is electrically connected to the control motherboard; the control motherboard is connected to the GNSS satellite antenna, satellite communication module, data processing module, magnetic switch, and storage module; the lithium battery pack is connected to the control motherboard, GNSS satellite antenna, satellite communication module, data processing module, and storage module, and the storage module can store data.

The present disclosure provides a wave spectrum calculation method based on GNSS wave buoys, which solves many limitations of traditional GNSS measurement methods applied to ocean buoy wave measurement, such as limited observation distance, high cost, cumbersome calculation and average accuracy, and the need for correction services. Compared with other methods for measuring buoy displacement, it has higher theoretical accuracy and does not require additional correction services, making it more suitable for wave measurement. The wave spectrum algorithm in this method can adapt to more complex observation environments and incorporate the results of the velocity measurement algorithm into a matched wave spectrum algorithm. The algorithm is simple and stable.

DESCRIPTION OF EMBODIMENTS

In order to make the purpose, technical solution, and advantages of the present disclosure clearer and understood, the following will provide further detailed explanations of the present disclosure in combination with embodiments. It should be understood that the specific embodiments described here are only intended to explain the present disclosure and are not intended to limit the present disclosure.

Figure 1:
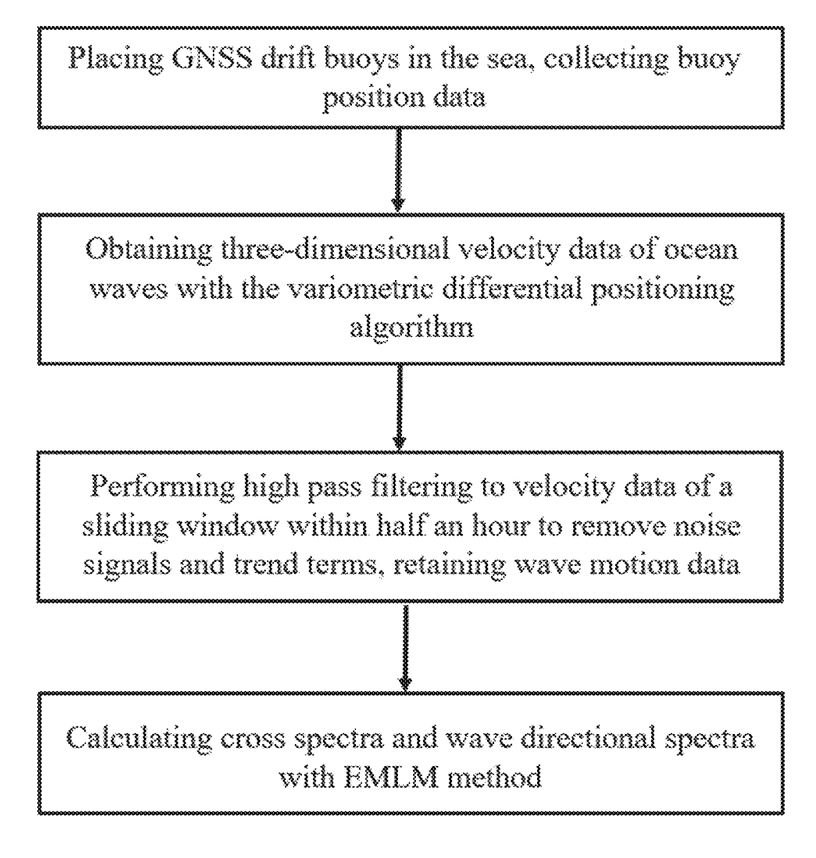
FIG. 1 is a flowchart of a wave spectrum calculation method based on GNSS wave buoys in the present disclosure.

Referring to FIG. 1, the present disclosure provides a wave spectrum calculation method based on GNSS wave buoys, a relative displacement of the buoy in a short time is calculated with a variometric differential positioning algorithm through high-frequency sampling results.

Specifically, the wave spectrum calculation method includes the following steps:

Step 1: placing GNSS drift buoys in the sea and collecting buoy position data.

The GNSS drift buoy includes a housing, on which a magnetic switch is provided. The housing is provided with a lithium battery pack, a control motherboard, a GNSS satellite antenna, a satellite communication module, a data processing module, and a storage module. The magnetic switch is electrically connected to the control motherboard. The control motherboard is connected to the GNSS satellite antenna, satellite communication module, data processing module, magnetic switch, and storage module. The lithium battery pack is connected to the control motherboard, GNSS satellite antenna, satellite communication module, data processing module, and storage module. The storage module is capable of temporarily storing data for a storage period of not less than 30 days.

This GNSS drift buoy has a miniaturized volume and a reasonable center of mass design that does not resonate with a dominant frequency of waves; which can be deployed by one single person, with a length, width, and height of 50 cm×50 cm×50 cm. The buoy has a well-controlled volume, reasonable design, strong wave following ability, and production deployment can save more manpower and material resources.

Step 2: obtaining three-dimensional velocity data of ocean waves with the variometric differential positioning algorithm.

The GNSS drift buoys drift on the ocean at a preset time of M1 (days can be set as needed), data measured during a drifting process of the GNSS drift buoys is preprocessed and transmitted to ship or shore base through Beidou or Iridium communication so as to achieve real-time transmission and processing of the data; the three-dimensional velocity data is obtained through the variometric differential positioning algorithm.

Specifically, during the drifting process of the GNSS drift buoy, GNSS satellite antenna receives raw data from the satellite (namely satellite and orbital products).

The raw data is transferred to a data processing module, which uses the variometric differential positioning algorithm to process the raw data and obtain attitude data of the buoys, which is the three-dimensional velocity data.

Attitude data of the buoys is introduced into the wave spectrum algorithm to obtain ocean environment data of the wave spectrum.

Then, through Beidou or Iridium communication, it is transmitted to ship-based or shore bases so as to achieve real-time data transmission and processing; at the same time, the raw data collected by GNSS drift buoys is stored in a storage module for subsequent other purposes.

The variometric differential positioning algorithm in the present disclosure is different from traditional positioning models of single point positioning and differential positioning. The variometric differential positioning algorithm only requires obtaining standard GPS broadcast products (orbit and ephemeris) and data collected by a separate dual frequency GPS receiver to perform data analysis. The variometric differential positioning algorithm in the present disclosure does not require complex technology or centralized data analysis, and can therefore be embedded in a GPS component.

Data collected from standard GPS broadcast products (orbit and ephemeris) and the separate dual frequency GPS receiver are inputted into the variometric differential positioning algorithm. A specific analysis method of the variometric differential positioning algorithm is as follows:

the variometric differential positioning algorithm is a differential observation equation obtained by subtracting standard original current carrying observation equation of adjacent epochs; various epochs dada of multiple satellites (at least four) are substituted into a variometric differential positioning model. By optimizing error term of the model, a plurality of observation equations for to-be-solved three-dimensional velocity are obtained; the three-dimensional velocity of the buoys is obtained by the observation equation with a least squares method when comminating a plurality of observation equations.

the standard original current carrying observation equation is formula (1):

$$\lambda \Phi_r^s = \rho_r^s + c(\delta t_r - \delta t^s) + T_r^s - I_r^s - \lambda N_r^s + p_r^s + m_r^s + \varepsilon_r^s \quad (1)$$

$\Phi_r^s$ is a carrier phase observation value of a receiver relative to a satellite; $\lambda$ is a carrier wavelength;

$\rho_r^s$ is a pseudorange between the satellite and the receiver;

c is the light speed;

$\delta t_r$ and $\delta t^s$ represent receiver clock error and satellite clock error respectively;

$T_r^s$ is a tropospheric error;

$I_r^s$ is an ionospheric error;

$N_r^s$ is an ambiguity of an entire week;

$p_r^s$ is other influence factors;

$m_r^s$ is a multipath effect;

$\varepsilon_r^s$ is noise influence.

Step 3: performing high pass filtering to velocity data of a sliding window within a preset time M2 to remove noise signals and trend terms, retaining wave motion data.

The wave spectrum of the sliding window is calculated every 20-30 minutes (i.e. a preset time M2). The sampling frequency is above 2.5 Hz.

Specifically, assuming the influence of cycle jumps is ignored, two adjacent epochs (t, t+1) are taken, and the two epochs (t, t+1) are respectively substituted into the standard original current carrying observation equation to obtain the observation values corresponding to the two epochs. The two equations are subtracted, an ionospheric error term is reduced to second order by applying ionospheric free combination to obtain the following ionospheric time single difference observation equation.

The ionospheric time single difference observation equation is formula (2):

$$\alpha[\lambda\Delta\Phi_r^s(t, t+1)]_{L1} + \beta[\lambda\Delta\Phi_r^s(t, t+1)]_{L2} = \quad (2)$$
$$\Delta\rho_r^s r(t, t+1) + c(\Delta\delta_r(t, t+1) - \Delta\delta^s(t, t+1)) +$$
$$\Delta T_r^s(t, t+1) + \Delta p_r^s(t, t+1) + \Delta m_r^s(t, t+1) + \Delta\varepsilon_r^s(t, t+1),$$

where $\alpha=(f^2/(f_{L1}^2-f_{L2}^2))$ and $\beta=(-f_{L2}^2/(f_{L1}^2-f_{L2}^2))$ are standard coefficient of ionospheric combination;

$\Delta\Phi_r^s$ is a difference of carrier phase observation value of the receiver relative to the satellite;

L1 is a first type of receiver frequency signal;

L2 is a second type of receiver frequency signal;

$\Delta\rho_r^s$ is a difference of pseudorange between the satellite and the receiver;

r is a subscript of the receiver;

$\Delta\delta_r$ is a difference of clock deviation of the receiver;

$\Delta\delta^s$ is a difference of clock deviation of the satellite;

$\Delta T_r^s$ is a difference in tropospheric error;

$\Delta p_r^s$ is an error difference affected by other factors;

$\Delta m_r^s$ is an error difference of multipath effects;

$\Delta\varepsilon_r^s$ is a noise value in a single time difference;

f is an expected signal frequency;

$f_{L1}^2$ is a square value of the first type receiver frequency;

$f_{L2}^2$ is a square value of the second type of receiver frequency.

In the geocentric cartesian coordinate system, $\Delta\rho_r^s(t,t+1)$ is affected by geometric changes $[\Delta\rho_r^s(t,t+1)]_{OR}$ caused by satellite orbit motion and Earth rotation, as well as solid tides and ocean loads $[\Delta\rho_r^s(t,t+1)]_{EtOl}$, as shown in formula (3):

$$\Delta\rho_r^s(t, t+1) = [\Delta\rho_r^s(t, t+1)]_{OR} + [\Delta\rho_r^s(t, t+1)]_{EtOl}, \quad (3)$$

in the formula, $\Delta\varepsilon_r^s(t,t+1)$ is the noise in a single time difference.

In this coordinate system, the GNSS drift buoys will generate a 3D displacement $\Delta\xi_r(t,t+1)$ (up and down, east-west, north-south) in unit time, if high frequency (>1 Hz) is used, the pseudorange variation is almost the same per unit time. According to formula (3), formula (4) can be obtained:

$$\Delta\rho_r^s(t, t+1) = [\Delta\rho_r^s(t, t+1)]_{OR} + [\Delta\rho_r^s(t, t+1)]_{EtOl} + [\Delta\rho_r^s(t, t+1)]_D \quad (4)$$
$$\Delta\rho_r^s(t, t+1) = [\Delta\rho_r^s(t, t+1)]_{OR} + [\Delta\rho_r^s(t, t+1)]_{EtOl} + e_r^s \cdot \Delta\xi_r(t, t+1),$$

$e_r^s$ is unit vector in all directions; $\Delta\rho_r^s$ is the difference of pseudorange S between the satellite and the receiver;

$\Delta\xi_r$ is a displacement scalar difference in three-dimensional direction of the receiver;

the displacement change of GNSS drift buoys per unit time can be considered as the velocity of GNSS drift buoys per unit time. Therefore, it can assume that the displacement of GNSS drift buoys in all directions per unit time is equal to its velocity in all directions. By integrating the velocity, position coordinates of GNSS drift buoys at a next measurement time can be obtained.

$\Delta T_r^s(t,t+1)$ is a change of a tropospheric delay term within a unit time interval, a tropospheric zenith delay $TZD_{SB}$ can be calculated by molding, a formula (5) is obtained with a simple inverse cosine function through a Saastamoinen model:

$$\Delta T_r^s(t, t+1) = TZD_{SB}[1/\cos(Z_r^s(t+1)) - 1/\cos(Z_r^s(t))], \quad (5)$$

$Z_r^s$ is a zenith angle of the satellite relative to the GNSS drift buoys, and the high frequency >1 Hz.

A formula (6) can be obtained through formulas (1), (2), (3), (4) and (5), $$\alpha[\lambda\Delta\Phi_r^s]_{L1} + \beta[\lambda\Delta\Phi_r^s]_{L2} = (e_r^s \cdot \Delta\xi_r + c\Delta\delta t_r) + \quad (6)$$
$$([\Delta\rho_r^s]_{OR} - c\Delta\delta t^s + TZD_{SB}[1/\cos(Z_r^s(t+1)) - 1/\cos Z_r^s(t))]) +$$
$$([\Delta\rho_r^s]_{EtOl} + \Delta p_r^s) + \Delta m_r^s + \Delta\varepsilon_r^s;$$

where $\alpha[\lambda\Delta\Phi_r^s]_{L1} + \Delta[\lambda\Delta\Phi_r^s]_{L2}$ is the observation value of time single difference without ionospheric influence, $(e_r^s \cdot \Delta\xi_r + c\Delta\delta t_r)$ is three-dimensional velocity result and four unknown terms of clock error of GNSS receiver, $\Delta\Phi_r^s$ is a difference of a carrier phase observation value of the receiver relative to the satellite;

$\Delta\xi_\gamma$ is a displacement scalar difference in three-dimensional direction of the receiver;

$\Delta\delta t_r$ is a difference of clock error of the receiver;

$\Delta p_r^s$ is a difference of pseudorange between the satellite and the receiver;

$\Delta\delta t^s$ is a difference of clock error of the satellite;

$\Delta p_r^s$ is difference of errors influence by other factors;

$\Delta m_r^s$ is a difference of error caused by multipath effects;

$\Delta\varepsilon_r^s$ is the noise difference in a single time difference.

The present disclosure requires data from at least four satellites in adjacent epochs to solve (least square method) through a system of simultaneous equations (formulas 1 to 6). The more satellite data obtained, the better of the result.

Step 4: calculating cross spectra and wave directional spectra with Longuet-Higgins method.

Specifically, the GNSS satellite antenna receives the satellite ephemeris file and transfers it to the data processing module. The data processing module reads the ephemeris file and inputs the original data consisting of carrier phase observations, pseudorange, and clock bias of each epoch in the ephemeris file into a system of simultaneous equations. The wave direction spectrum is obtained through the Longuet-Higgins method, and the three-dimensional velocity of the buoys is calculated;

three-dimensional information calculated of the buoys is denoted as $\phi\eta_{tt}$, $\eta_x$, $\eta_y$, then a cross spectral matrix can be written as formula (7):

$$\Phi_{mn} = \begin{pmatrix} \phi_{\eta_{tt}\eta_{tt}} & \phi_{\eta_{tt}\eta_x} & \phi_{\eta_{tt}\eta_y} \\ \phi_{\eta_x\eta_{tt}} & \phi_{\eta_x\eta_x} & \phi_{\eta_x\eta_y} \\ \phi_{\eta_y\eta_{tt}} & \phi_{\eta_y\eta_x} & \phi_{\eta_y\eta_y} \end{pmatrix}, \quad (7)$$

elements of the cross spectral matrix can be normalized by dividing a transfer function, and a normalized cross spectral matrix is formula (8):

$$\Phi'_{mn} = \begin{pmatrix} n_{11} & n_{12} & n_{13} \\ n_{12} & n_{22} & n_{23} \\ n_{13} & n_{23} & n_{33} \end{pmatrix}, \quad (8)$$

where $$n_{11} = \frac{\phi_{\eta_{tt}\eta_{tt}}}{w^4},$$
$$n_{12} = \frac{\phi_{\eta_{tt}\eta_x}}{-ikw^2},$$
$$n_{13} = \frac{\phi_{\eta_{tt}\eta_y}}{-ikw^2},$$
$$n_{22} = \frac{\phi_{\eta_x\eta_x}}{-k^2},$$
$$n_{23} = \frac{\phi_{\eta_x\eta_y}}{-k^2},$$
$$n_{33} = \frac{\phi_{\eta_y\eta_y}}{-k^2},$$

in the formulas (7) and (8), all elements are real number; w is a frequency of power spectral density at the expected frequency; k is wavenumber at the expected frequency.

All elements in the cross spectral matrix are real numbers, which indicates the frequency of the power spectral density at the desired frequency; and the wavenumber is at the expected frequency.

The matrix is inverted to obtain the wave direction spectrum, and the calculation formula is formula (9):

$$F(\omega, \theta) = Q(\omega)\Big[M_0 M_2(\gamma^2\cos^2\hat\theta + \sin^2\hat\theta) - \quad (9)$$
$$M_1^2 \sin^2(\hat\theta - \hat\theta_m) - 2M_1 M_2(\gamma^2 \cos\hat\theta\cos\hat\theta_m + \sin\hat\theta\sin\hat\theta_m) + M_2^2\gamma^2\Big]^{-1},$$

where $$M_0 = n_{11},$$
$$M_1 = \sqrt{(n_{12}^2 + n_{13}^2)},$$
$$M_2 = \frac{n_{22} + n_{33}}{2} + \sqrt{\left(\frac{n_{22} - n_{33}}{2}\right)^2 + n_{23}^2},$$
$$\hat\theta = \theta - \theta_p,$$
$$\hat\theta_m = \theta_m - \theta_p,$$
$$\theta_m = \tan^{-1}\left(\frac{n_{13}}{n_{12}}\right),$$
$$\theta_p = \frac{1}{2}\tan^{-1}\left(\frac{2n_{23}}{n_{22} - n_{33}}\right)$$
$$\gamma^2 = \frac{(n_{22} + n_{33}) - \sqrt{(n_{22} - n_{33})^2 + 4n_{23}^2}}{(n_{22} + n_{33}) + \sqrt{(n_{22} - n_{33})^2 + 4n_{23}^2}},$$

Q(w) is a normalization factor, $M_1^2$ is a combination coefficient, $M_1$ is a square value, $M_2^2$ is a combination coefficient, that is, $M_2$ is a square value.

The present disclosure provides a wave spectrum calculation method based on GNSS wave measuring buoy, which solves limitations of traditional GNSS measurement methods applied to ocean buoy wave measurement, such as limited observation distance, high cost, cumbersome calculation and average accuracy, and a need for correction services. Compared with other methods for measuring buoy displacement, it has higher theoretical accuracy and does not require additional correction services, it is more suitable for wave measurement. The wave spectrum algorithm in this method can adapt to more complex observation environments and incorporate results of velocity measurement algorithm into a matched wave spectrum algorithm. The algorithm is simple and stable.

Of course, there may be a plurality of other embodiments of the present disclosure, and those skilled in the art may make various corresponding changes and deformations based on the present disclosure without departing from the spirit and essence of the present disclosure. However, these corresponding changes and deformations should all fall within the protection scope of the claims of the present disclosure.

What is claimed is:

1. A wave spectrum calculation method based on global navigation satellite system (GNSS) wave measuring buoy, applied in wave measurement, wherein a relative displacement of a buoy in a short time is calculated through high-frequency sampling results with a variometric differential positioning algorithm; the wave spectrum calculation method comprising the following steps:
   step 1: placing a GNSS drift buoy in a sea, and collecting, by the GNSS drift buoy, buoy position data, wherein the GNSS drift boy comprises a housing, the housing is provided with a data processing module, a GNSS satellite antenna, and a control motherboard, and the control motherboard is connected to the data processing module and the GNSS satellite antenna;
   step 2: obtaining three-dimensional velocity data of ocean waves with the variometric differential positioning algorithm, comprising: receiving, by the GNSS satellite antenna, raw data from a satellite, transferring, by the GNSS satellite antenna, the raw data to the data processing module, and processing, by the data processing module, the raw data by using the variometric differential positioning algorithm to thereby obtain the three-dimensional velocity data of the ocean waves;
   step 3: performing, by the data processing module, high pass filtering to velocity data of a sliding window within a preset time M2 to remove noise signals and trend terms, retaining wave motion data;
   step 4: calculating, by the data processing module, cross spectra and wave directional spectra with Longuet-Higgins method.

2. The wave spectrum calculation method based on GNSS wave measuring buoy according to claim 1, wherein in step 2, the GNSS drift buoy drifts on the ocean at a preset time M1, data measured during a drifting process of the GNSS drift buoy is preprocessed and transmitted to ship or shore base through Beidou or Iridium communication so as to achieve real-time transmission and processing of the data; the three-dimensional velocity data is obtained through the variometric differential positioning algorithm.

3. The wave spectrum calculation method based on GNSS wave measuring buoy according to claim 2, wherein the variometric differential positioning algorithm is a differential observation equation obtained by subtracting standard original current carrying observation equation of adjacent epochs; various epochs dada of multiple satellites are substituted into a variometric differential positioning model, a plurality of observation equations for to-be-solved three-dimensional velocity are obtained with the variometric differential positioning algorithm; the three-dimensional velocity of the buoys is obtained by the observation equation with a least squares method;

the standard original current carrying observation equation is formula (1):

$$\lambda \Phi_r^s = \rho_r^s + c(\delta t_r - \delta t^s) + T_r^s - I_r^s - \lambda N_r^s + p_r^s + m_r^s + \varepsilon_r^s, \quad (1)$$

$\Phi_r^s$ is a carrier phase observation value of a receiver relative to a satellite; $\lambda$ is a carrier wavelength;
$\rho_r^s$ is a pseudorange between the satellite and the receiver;
c is the light speed;
$\delta t_r$ and $\delta t^s$ represent receiver clock error and satellite clock error respectively;
$T_r^s$ is a tropospheric error;
$I_r^s$ is an ionospheric error;
$N_r^s$ is an ambiguity of an entire week;
$p_r^s$ is other influence factors;
$m_r^s$ is a multipath effect;
$\varepsilon_r^s$ is noise influence.

4. The wave spectrum calculation method based on GNSS wave measuring buoy according to claim 3, wherein in step 3, two adjacent epochs (t, t+1) are taken, the two epochs (t, t+1) are respectively substituted into the standard original current carrying observation equation to obtain observation values corresponding to the two epochs; the two equations are subtracted, an ionospheric error term is reduced to second order by applying ionospheric free combination to obtain the following ionospheric time single difference observation equation;

the ionospheric time single difference observation equation is formula (2):

$$\alpha[\lambda \Delta \Phi_r^s(t, t-1)]_{L1} + \beta[\lambda \Delta \Phi_r^s(t, t+1)]_{L2} = \Delta p_r^s(t, t+1) \quad (2)$$
$$+ c(\Delta \delta_r(t, t+1) - \Delta \delta^s(t, t+1))$$
$$+ \Delta T_r^s(t, t+1)$$
$$+ \Delta p_r^s(t, t+1),$$
$$+ \Delta m_r^s(t, t+1)$$
$$+ \Delta \varepsilon_r^s(t, t+1),$$

wherein, $\alpha=(f^2)/(f_{L1}^2-f_{L2}^2)$ $\alpha=(f^2/(f_{L1}^2-f_{L2}^2))$ and $\beta=(-f_{L2}^2/(f_{L1}^2-f_{L2}^2))\beta=(-_{L2}^2/(f_{L1}^2-f_{L2}^2))$ are standard coefficient of ionospheric combinations;
$\Delta \Phi_r^s$ is a difference of carrier phase observation value of the receiver relative to the satellite;
L1 is a first type of receiver frequency signal;
L2 is a second type of receiver frequency signal;
$\Delta \rho_r^s$ is a difference of pseudorange between the satellite and the receiver;
r is a subscript of the receiver;
$\Delta \delta_r$ is a difference of clock deviation of the receiver;
$\Delta \delta^s$ is a difference of clock deviation of the satellite;
$\Delta T_r^s$ is a difference in tropospheric error;
$\Delta p_r^s$ is an error difference affected by other factors;
$\Delta m_r^s$ is an error difference of multipath effects;
$\Delta \varepsilon_r^s$ is a noise value in a single time difference;
f is an expected signal frequency;
$f_{L1}^2$ is a square value of a first type receiver frequency;
$f_{L2}^2$ is a square value of a second type of receiver frequency.

5. The wave spectrum calculation method based on GNSS wave measuring buoy according to claim 4, wherein in the geocentric cartesian coordinate system, $\Delta \rho_r^s(t,t+1)$ $\Delta \rho_r^s(t,$ t+1) is affected by geometric changes $[\Delta\rho_r^s(t,t+1)]_{OR}$ $[\Delta\rho_r^s(t,t+1)]_{OR}$ caused by satellite orbit motion and Earth rotation, as well as affected by solid tides and ocean loads $[\Delta\rho_r^s(t,t+1)]_{EtOl}$ For $[\Delta\rho_r^s(t,t+1)]_{EtOl}$, as shown in formula (3):

$$\Delta\rho_r^s(t, t+1) = [\Delta\rho_r^s(t, t+1)]_{OR} + [\Delta\rho_r^s(t, t+1)]_{EtOl}, \quad (3)$$

in the formula, $\Delta\varepsilon_r^s(t,t+1)$ is the noise in a single time difference.

6. The wave spectrum calculation method based on GNSS wave measuring buoy according to claim 5, wherein the GNSS drift buoy generate a 3D direction displacement $\Delta\xi_r(t,t+1)\Delta\xi_r(t,t+1)$ in unit time; a calculation formula is formula (4) when a high-frequency calculation is used:

$$\Delta\rho_r^s(t, t+1) = [\Delta\rho_r^s(t, t+1)]_{OR} + [\Delta\rho_r^s(t, t+1)]_{EtOl} + [\Delta\rho_r^s(t, t+1)]_D \quad (4)$$

$$\Delta\rho_r^s(t, t+1) = [\Delta\rho_r^s(t, t+1)]_{OR} + [\Delta\rho_r^s(t, t+1)]_{EtOl} + e_r^s \cdot \Delta\xi_r(t, t+1)$$

$e_r^s$ is unit vector in all directions; $\Delta\rho_r^s$ is the difference of pseudorange between the satellite and the receiver; $\Delta\xi_r$ is a displacement scalar difference in three-dimensional direction of the receiver;

$\Delta T_r^s(t,t+1)\Delta T_r^s(t,t+1)$ is a change of a tropospheric delay term within a unit time interval, a tropospheric zenith delay $TZD_{SB}TZD_{SB}$ can be calculated by molding, a formula (5) is obtained with a simple inverse cosine function through a Saastamoinen model:

$$\Delta T_r^s(t, t+1) = TZD_{SB}[1/\cos(Z_r^s(t+1)) - 1/\cos(Z_r^s(t))] \quad (5)$$

$$\Delta T_r^s(t, t+1) = TZD_{SB}[1/\cos(Z_r^s(t+1)) - 1/\cos(Z_r^s(t))]$$

$Z_r^s$ is a zenith angle of the satellite relative to the GNSS drift buoy, and the high frequency >1 Hz.

7. The wave spectrum calculation method based on GNSS wave measuring buoy according to claim 6, a formula (6) can be obtained through formulas (1), (2), (3), (4) and (5)

$$\alpha[\lambda\Delta\Phi_r^s]_{L1} + \beta[\lambda\Delta\Phi_r^s]_{L2} = (e_r^s \cdot \Delta\xi_r + c\Delta\delta t_r) + \quad (6)$$

$$([\Delta\rho_r^s]_{OR} - c\Delta\delta t^s + TZD_{SB}[1/\cos(Z_r^s(t+1)) - 1/\cos Z_r^s(t))]) +$$

$$([\Delta\rho_r^s]_{EtOl} + \Delta p_r^s) + \Delta m_r^s + \Delta\varepsilon_r^s,$$

wherein $\alpha[\lambda\Delta\Phi_r^s]_{L1}+\beta[\lambda\Delta\Phi_r^s]_{L2}\alpha[\lambda\Delta\Phi_r^s]_{L1}+\beta[\lambda\Delta\Phi_r^s]_{L2}$ is the observation value of time single difference without ionospheric influence, $(e_r^s \cdot \Delta\xi_r + c\Delta\delta t_r)$ $(e_r^s \cdot \Delta\xi_r + c\Delta\delta t_r)$ is three-dimensional velocity result and four unknown terms of clock error of GNSS receiver, $\Delta\Phi_r^s$ is a difference of a carrier phase observation value of the receiver relative to the satellite;

$\Delta\xi_r$ is a displacement scalar difference in three-dimensional direction of the receiver;

$\Delta\delta t_r$ is a difference of clock error of the receiver;

$\Delta\rho_r^s$ is a difference of pseudorange between the satellite and the receiver;

$\Delta\delta t^s$ is a difference of clock error of the satellite;

$\Delta p_r^s$ is difference of errors influence by other factors;

$\Delta m_r^s$ is a difference of error caused by multipath effects;

$\Delta\varepsilon_r^s$ is the noise difference in a single time difference.

8. The wave spectrum calculation method based on GNSS wave measuring buoy according to claim 7, wherein in step 4, the GNSS satellite antenna receives satellite ephemeris file and transmits the ephemeris file to the data processing module; the data processing module reads the ephemeris file, inputs original data consisting of carrier phase observations, pseudorange, and clock deviation of each epoch in the ephemeris file into a simultaneous equation system, the wave direction spectrum is obtained through the Longuet-Higgins method, and the three-dimensional velocity of the buoys is calculated;

three-dimensional information calculated of the buoys is denoted as $\phi_{\eta_{tt}}, \eta_x, \eta_y$, then a cross spectral matrix can be written as formula (7):

$$\Phi_{mn} = \begin{pmatrix} \phi_{\eta_{tt}\eta_{tt}} & \phi_{\eta_{tt}\eta_x} & \phi_{\eta_{tt}\eta_y} \\ \phi_{\eta_x\eta_{tt}} & \phi_{\eta_x\eta_x} & \phi_{\eta_x\eta_y} \\ \phi_{\eta_y\eta_{tt}} & \phi_{\eta_y\eta_x} & \phi_{\eta_y\eta_y} \end{pmatrix} \quad (7)$$

elements of the cross spectral matrix are normalized by dividing a transfer function G(w), and a normalized cross spectral matrix is formula (8):

$$\Phi'_{nm} = \begin{pmatrix} n_{11} & n_{12} & n_{13} \\ n_{12} & n_{22} & n_{23} \\ n_{13} & n_{23} & n_{33} \end{pmatrix}, \quad (8)$$

wherein $$n_{11} = \frac{\phi_{\eta_{tt}\eta_{tt}}}{w^4},$$

$$n_{12} = \frac{\phi_{\eta_{tt}\eta_x}}{-ikw^2},$$

$$n_{13} = \frac{\phi_{\eta_{tt}\eta_y}}{-ikw^2},$$

$$n_{22} = \frac{\phi_{\eta_x\eta_y}}{-k^2},$$

$$n_{23} = \frac{\phi_{\eta_x\eta_y}}{-k^2},$$

$$n_{33} = \frac{\phi_{\eta_y\eta_y}}{-k^2},$$

in the formulas (7) and (8), all elements are real number; w is a frequency of power spectral density at the expected frequency; k is wavenumber at the expected frequency.

9. The wave spectrum calculation method based on GNSS wave measuring buoy according to claim 8, wherein the matrix of formulas (7) and (8) is inverted to obtain the three-dimensional velocity of the buoys, and a calculation formula is formula (9):

$$F(\omega, \theta) = Q(\omega)\left[M_0 M_2(\gamma^2\cos^2\theta + \sin^2\theta) - \quad (9)\right.$$

$$\left. M_1^2\sin^2(\theta - \theta_m) - 2M_1 M_2(\gamma^2\cos\theta\cos\theta_m + \sin\theta\sin\theta_m) + M_2^2\gamma^2\right]^{-1},$$

wherein $$M_0 = n_{11},$$

$$M_1 = \sqrt{(n_{12}^2 + n_{13}^2)},$$

$$M_2 = \frac{n_{22} + n_{33}}{2} + \sqrt{\left(\frac{n_{22} - n_{33}}{2}\right)^2 + n_{23}^2},$$

-continued $$\hat{\theta} = \theta - \theta_p,$$

$$\hat{\theta}_m = \theta_m - \theta_p,$$

$$\theta_m = \tan^{-1}\left(\frac{n_{13}}{n_{12}}\right),$$

$$\theta_p = \frac{1}{2}\tan^{-1}\left(\frac{2n_{23}}{n_{22} - n_{33}}\right)$$

$$\gamma^2 = \frac{(n_{22} + n_{33}) - \sqrt{(n_{22} - n_{33})^2 + 4n_{23}^2}}{(n_{22} + n_{33}) + \sqrt{(n_{22} - n_{33})^2 + 4n_{23}^2}},$$

wherein Q(ω) is a normalization factor, $M_1^2$ is a combination coefficient, $M_1$ is a square value, $M_2^2$ is a combination coefficient, that is, $M_2$ is a square value.

10. A wave spectrum calculation method based on global navigation satellite system (GNSS) wave measuring buoy, applied in wave measurement, wherein a relative displacement of a buoy in a short time is calculated through high-frequency sampling results with a variometric differential positioning algorithm; the wave spectrum calculation method comprising the following steps:

step 1: placing a GNSS drift buoy in a sea, and collecting, by the GNSS drift buoy, buoy position data, wherein the GNSS drift boy comprises a housing, the housing is provided with a data processor, a GNSS satellite antenna, and a control motherboard, and the control motherboard is connected to the data processor and the GNSS satellite antenna;

step 2: obtaining three-dimensional velocity data of ocean waves with the variometric differential positioning algorithm, comprising: receiving, by the GNSS satellite antenna, raw data from a satellite, transferring, by the GNSS satellite antenna, the raw data to the data processor, and processing, by the data processor, the raw data by using the variometric differential positioning algorithm to thereby obtain the three-dimensional velocity data of the ocean waves;

step 3: performing, by the data processor, high pass filtering to velocity data of a sliding window within a preset time M2 to remove noise signals and trend terms, retaining wave motion data;

step 4: calculating, by the data processor, cross spectra and wave directional spectra with Longuet-Higgins method.

* * * * *